(12) United States Patent
Giuffrida

(10) Patent No.: US 10,949,451 B2
(45) Date of Patent: Mar. 16, 2021

(54) SYSTEM AND METHOD FOR MANAGING AND RETRIEVING DISPARATE GEOGRAPHICALLY CODED DATA IN A DATABASE

(71) Applicant: Jonathan Giuffrida, Chicago, IL (US)

(72) Inventor: Jonathan Giuffrida, Chicago, IL (US)

(*) Notice: Subject to any disclaimer, the term of this patent is extended or adjusted under 35 U.S.C. 154(b) by 224 days.

(21) Appl. No.: 16/118,942

(22) Filed: Aug. 31, 2018

(65) Prior Publication Data

US 2019/0073379 A1 Mar. 7, 2019

Related U.S. Application Data

(60) Provisional application No. 62/553,585, filed on Sep. 1, 2017.

(51) Int. Cl.
| | |
|---|---|
| G06F 17/30 | (2006.01) |
| G06F 16/29 | (2019.01) |
| G06F 16/248 | (2019.01) |
| G06F 16/2458 | (2019.01) |
| G06F 16/9537 | (2019.01) |

(52) U.S. Cl.
CPC ............ *G06F 16/29* (2019.01); *G06F 16/248* (2019.01); *G06F 16/2462* (2019.01); *G06F 16/9537* (2019.01)

(58) Field of Classification Search
CPC ........ G06F 16/13; G06F 16/24; G06F 16/156; G06F 16/283
See application file for complete search history.

(56) References Cited

U.S. PATENT DOCUMENTS

| | | | | |
|---|---|---|---|---|
| 9,378,571 | B1* | 6/2016 | Jones | G06F 3/04842 |
| 9,442,905 | B1* | 9/2016 | Kawaguchi | G06F 40/221 |
| 10,198,158 | B2* | 2/2019 | Hao | G09B 29/007 |
| 2008/0065628 | A1* | 3/2008 | Bansal | G06F 16/29 |
| 2014/0320485 | A1* | 10/2014 | Neophytou | G06K 9/00214 345/419 |
| 2015/0169523 | A1* | 6/2015 | Charaniya | G06F 40/169 715/232 |
| 2015/0199844 | A1* | 7/2015 | Monroy-Hernandez | G06T 17/05 345/419 |
| 2015/0356088 | A1* | 12/2015 | Berkhin | G06F 16/24578 707/748 |

(Continued)

*Primary Examiner* — Hung D Le
(74) *Attorney, Agent, or Firm* — McDonald Hopkins LLC; James P. Muraff

(57) ABSTRACT

Method and apparatus are disclosed for a system and method for managing and retrieving disparate geographically coded data in a database. An example system for processing a search query for geocoded data includes a database with the geocoded data associated with first and second geographic subdivisions and a computing device. When new geocoded data associated with the first geographic subdivision is not associated with the second geographic subdivision, the computing device generates values associated with the second geographic subdivision for the new geocoded data based on geographic overlap of the first and second geographic subdivisions and inserts the values into the entity-attribute-value database. In response to receiving a query from one of the end-user devices for the new geocoded data associated with the second geographic subdivisions, the computing device provides the values in a query response.

20 Claims, 7 Drawing Sheets

(56) References Cited

U.S. PATENT DOCUMENTS

2015/0379429 A1* 12/2015 Lee .................... G09B 5/00
  706/11
2017/0109441 A1* 4/2017 Berk ................ G06F 16/24575

* cited by examiner

SYSTEM AND METHOD FOR MANAGING AND RETRIEVING DISPARATE GEOGRAPHICALLY CODED DATA IN A DATABASE

CROSS-REFERENCE TO RELATED APPLICATIONS

This application claims benefit of U.S. Provisional Application No. 62/553,585, which was filed on Sep. 1, 2017 and is incorporated by reference herein in its entirety.

TECHNICAL FIELD

The present disclosure generally relates to database management systems and, more specifically, a system and method for managing and retrieving disparate geographically coded data in a database.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a system and method for managing and retrieving disparate geographically coded data in a database. A system for processing a search query for geocoded data includes an entity-attribute-value database, a network connector, and a computing device. The entity-attribute-value database includes the geocoded data associated with first and second geographic subdivisions (e.g., with Census tract subdivisions and with neighborhood subdivisions). The network connector communicatively couples to end-user devices and database providers. The computing device (i) in response to receiving new geocoded data from one of the end-user devices or one of the database providers, determines whether the new geocoded data is associated with the second geographic subdivision, (ii) in response to determining that the new geocoded data is not associated with the second geographic subdivision, generates values associated with the second geographic subdivision for the new geocoded data based on geographic overlap of the first and second geographic subdivisions stored in the EAV database, (iii) inserts the values into the EAV database, and (iv) in response to receiving a query from one of the end-user devices for the new geocoded data associated with the second geographic subdivisions, provides the values in a query response.

An example method to process a search query for geocoded data includes maintaining a database that includes the geocoded data associated with first and second geographic subdivisions and communicatively coupling to end-user devices and database providers. The method also includes, in response to receiving new geocoded data associated with at least the first geographic subdivision from one of the end-user devices or one of the database providers, determining whether the new geocoded data is associated with the second geographic subdivision. Additionally, the method includes, in response to determining that the new geocoded data is not associated with the second geographic subdivision, generating values associated with the second geographic subdivision for the new geocoded data based on geographic overlap of the first and second geographic subdivisions stored in the database and inserting the values into the database. The method also includes, in response to receiving the search query from one of the end-user devices for the new geocoded data associated with the second geographic subdivisions, providing the values in a query response.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
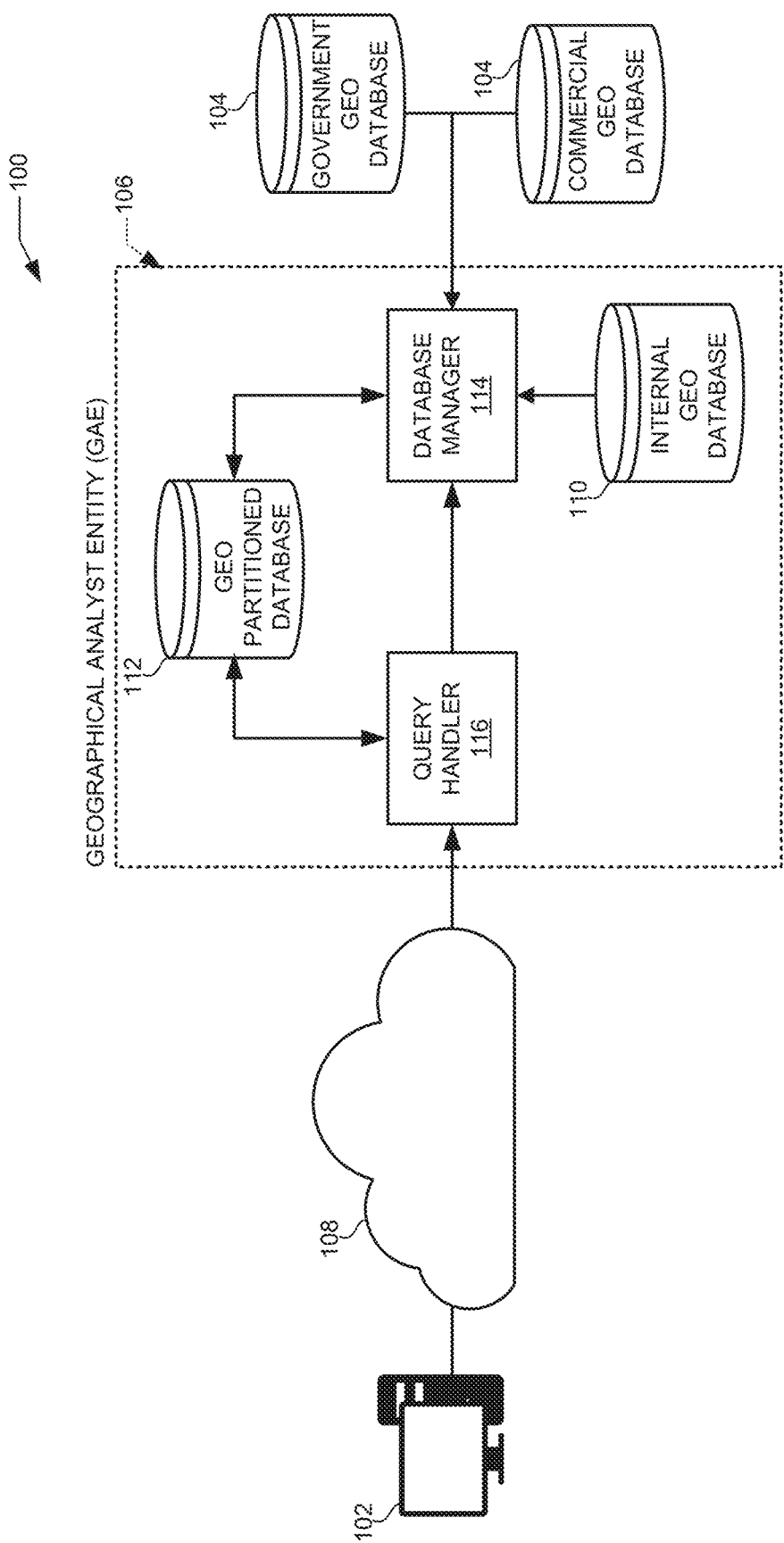
FIG. 1 illustrates a system operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Often, database providers collect data based on geographical subdivisions that are geographically bound to a defined region. For example, the For example, the U.S. Census Bureau measures ethnicity data by census tract. The database providers include government agencies (e.g., the U.S. Census Bureau, the National Vital Statistics System, the Illinois Department of Public Health, the Chicago Police Department, etc.), private companies (e.g., the Illinois Health and Hospital Association, etc.), and/or proprietary sources (e.g., a hospital's own aggregate medical statistical data, etc.). As used herein, "geographically coded data" refers to statistical and/or measurement data that is associated with a particular geographical subdivision.

Geographical subdivisions have boundaries defined by governmental and/or private organizations to relate statistics and/or measurements about people that live within the geographical subdivision. The geographical subdivisions include nations (e.g., the United States, etc.), primary nation subdivisions, (e.g., states, provinces, prefectures, cantons, districts, territories, etc.), counties (e.g., Cook County, etc.), electoral districts (e.g., congressional districts, state senate districts, etc.), zip codes, cities/towns/villages (e.g., Chicago, Houston, etc.), wards, community areas (e.g., defined neighborhoods, police precincts, etc.), census tracts, and/or service regions (e.g., the service region for a hospital or a transit authority, etc.), etc. For example, the data may indicate the medium household income of people living in a census tract. These geographic subdivisions are generally static so changes in measurements can be compared over time. Often, these statistics and/or measurements are divided into different demographic groups (e.g., by age, by ethnicity, by gender, by education level, by nationality, by religion, etc.). However, different database providers provide their geographically coded data associated with different geographical subdivisions. For example, one database provider may provide medium household income geographically coded to census tracts and another database provider may provide the incidence of diabetes per 100,000 people geographically coded to zip codes. In that example, using the data as provided by the database providers, a person could not compare the incidence of diabetes per 100,000 people by medium household income for a hospital service region that encompasses parts of different zip codes and different census tracts.

Under traditional principles for designing relational databases, geographies would be the rows (observations) of a table and the demographic, measurement, and statistical data would be the columns (fields) of the table. However, with large data sets comprised of many demographic, measurement, and statistical fields for each observation, these relational databases are slow and scale on the order of O(N) because of constraints on the number of columns in each table and the necessity of guaranteeing a unique and retrievable name for each column. This necessitates creating multiple tables with the same structure, often delineated by topic, e.g. one table for demographic data, another for income-related data, another for health outcomes, etc. Because data stored in this format must be distributed across multiple similar tables, queries into the database often pull from multiple data tables at once. Retrieving information from such table(s) is inefficient and time consuming, requiring large table(s) to be queried regardless of the information to be retrieved from the database. For example, in the United States, there are approximately one million geographic subdivisions of the aforementioned types. In such an example, a table in a traditional relational database would have one million rows. Additionally, if there are 500 topics (e.g., types of data points, such as the unemployment rate or incidence of diabetes per 100,000 people) and each topic is split into up to 90 demographic categories and 10 time periods, then the table in the traditional relational database would have up to 450,000 columns. Additionally, storing the standard error for each value would require a doubling of the size of the database to 900,000 columns. Additionally, because data is only defined for certain geographic subdivisions, a traditional relational data base would have memory for data that would not be filled. For example, the unemployment rate may be geographically coded to census tracts. In such an example, the rows for the other geographical subdivisions would have no data for the unemployment rate. Additionally, the indices to speed querying on such tables would be hampered by the large page sizes required to store observations with many fields, further slowing database performance.

As disclosed below, the geographically encoded data from the database providers is mapped to any other geographic subdivision. Additionally, the system uses a entity-attribute-value (EAV) database to store the geographically coded data and the associated metadata. Mapping the geographically coded data has two forms: (a) mapping to a first geographic subdivision from multiple second geographic subdivisions that at least in part comprise portions of the first geographic subdivision, and (b) mapping to a first geographic subdivision that is encompassed by a second geographic subdivision. To map geographically coded data and the corresponding error data to a first geographic subdivision from multiple second geographic subdivisions, the system retrieves from the percentages that the second geographic subdivisions overlap the first geographic subdivision from the database. These percentages are used as weights in a weighted sum or weighted average. For example, 99% of census tract A may comprise 45% of a community area (sometime referred to as a "neighborhood"), 25% of census tract B may comprise 32% of the community area, 75% of census tract C may comprise 18% of the community area, and 4% of census tract D may comprise 5% of a community area. In such an example, census tract A may contribute 0.446 (unitless) of its geographically coded data to the community area, census tract B may contribute 0.080 of its geographically coded data to the community area, census tract C may contribute 0.135 of its geographically coded data to the community area, and census tract D may contribute 0.135 of its geographically coded data to the community area, summing to a value for the community area of 0.796 (crimes committed per person per year, or percent of residents of Scandinavian ancestry, or etc.).

The entity-attribute-value (EAV) database is comprised of multiple tables that limit the frequency and the amount of data being obtain from large tables. Attribute table(s) and value table(s) store the geographically coded data while other tables store metadata to support quickly accessing the geographically coded data of interest. Because the tables in the EAV database are comparatively narrow (e.g., do not have many columns), data is retrieved comparatively quickly relative to a standard relational databases that are wide, and index performance is maximized. For example, the widest table in the EAV database may be 20 columns while, as discussed above, the standard relational database storing the geographically coded data may be 450,000 columns wide, split across multiple tables. Additionally, scaling the EAV database is on the order of O(1). However, generally, persons of ordinary skill in the art teach away from using an EAV model for a database because potential design complexity and/or difficulties with allowing users define metadata during runtime. As discussed below, the geographically coded data in the EVA database of the present disclosure (e.g., the geo partitioned database) is cleaned during a preprocessing step and metadata will not be changed by users during runtime. Additionally, the EAV database includes pre-aggregated data, and statistical analysis of the geographically coded data (e.g., mean values, median values, counts, etc.) may be performed during off-peak hours and put into a separate table. Such factors, combined with the flexibility demanded by the database operations as outlined above, demonstrate that an EAV database model is, in fact, highly useful for presenting geographically aggregated data for applications such as the one outlined here, despite common wisdom and advice to the contrary.

FIG. 1 illustrates a system 100 operating in accordance with the teachings of this disclosure. In the illustrated example, the system 100 includes end-user devices 102, geographically coded database providers 104, and a geographical analyst entity (GAE) 106. The example end-user devices 102 are communicatively coupled to the GAE 106 via a network 108 (e.g., an intranet, the Internet, etc.). Example end-user devices 102 include desktop computers, laptop computers, tablets, smartphones, and/or workstations, etc. In some examples, the end-user devices 102 accesses the database(s) of the GAE 106 using a web interface (e.g., through a website, etc.) and/or an Application Programming Interface (API). A user submits queries to the GAE 106 to retrieve and/or analyze geographically coded measurement and/or statistical data (sometimes referred to as "geocoded data") for one or more geographic subdivisions of interest regardless of the geographical subdivision associated with the raw geocoded data (e.g., the data as provided by the database providers 104, etc.).

The geographically coded database providers 104 include public entities (e.g., government agencies, etc.) and/or private entities (e.g., non-profit organizations, for-profit corporations, think tanks, etc.). For example, the public entities may include federal agencies (e.g., the United States Census Bureau, Centers for Disease Control and Prevention, National Center for Health Statistics, the Department of Housing and Urban Development, etc.), state agencies (e.g., the Illinois Department of Public Health, etc.), county agencies, and/or municipality agencies (e.g., the Chicago Police Department, the Chicago Department of Public Health, etc.). The database providers 104 provide measurement and statistical data regarding populations, such as demographic data (e.g., ancestry, educational attainment, income, language proficiency, migration, disability, employment, housing characteristics, etc.), health raw and statistical data (e.g., instances of diagnosis of a particular disease or condition, birth rates, etc.), geographical data (e.g., housing density, land area, population density, etc.), and/or environmental data (e.g., proximity to industrial waste sites, air particular matter, etc.), etc. For example, the United States Census Bureau provides data from the American Community Survey and the Decennial Census that includes measurements and statistics related to a wide range of topics, such as higher education rate, households below 150% of the poverty level, Czech ancestry, mean retirement income, and the uninsured rate, etc.

The measurement and statistical data are associated with a type of geographical subdivision. For example, the American Community Survey is associated with census tracts. The census tracts are contiguous areas that use visible and identifiable features (such as streets) and generally encompass an area with a population of 1,200 to 8,000 people. The census tracts are generally the smallest measurement/statistical area. However, different data from different database providers 104 are associated with different geographical subdivisions. For example, Illinois Department of Health may provide data regarding incidences of cancer diagnosis that is associated with zip codes. However, in such an example, if a user wants to compare the incidences of cancer diagnosis with households below 150% of the poverty level for a geographic subdivision defined as a hospital's service area, the geocoded data needs to be transformed by the GAE 106.

The GAE 106 may be any entity that collects and/or disseminates statistical and measurement data about populations (e.g., a non-profit organization, a for-profit company, a government agency, etc.). The GAE 106 receives or otherwise retrieves the geocoded data from the database providers 104. The GAE 106 processes the geocoded data and inserts the data into a database. The GAE 106 receives queries from the end-user devices 102, queries the database for the requested data, transforms the data to fit the requested geographic subdivision, and displays and/or provides the transformed data to the requesting end-user device 102. In some examples, the GAE 106 collects and analyzes measurement/statistical data to supplement the geocoded data provided by the database providers 104. In the illustrated example, the GAE 106 includes an internal geo database 110, an geo partitioned database 112, a database manager 114, and a query handler 116.

The internal geo database 110 includes geocoded data collected by the GAE 106. Like geocoded data supplied by the database providers 104, the internal geo database 110 includes measurement and/or statistical data associated with geographical subdivisions. The internal geo database 110 may be any type of database.

Figure 2:
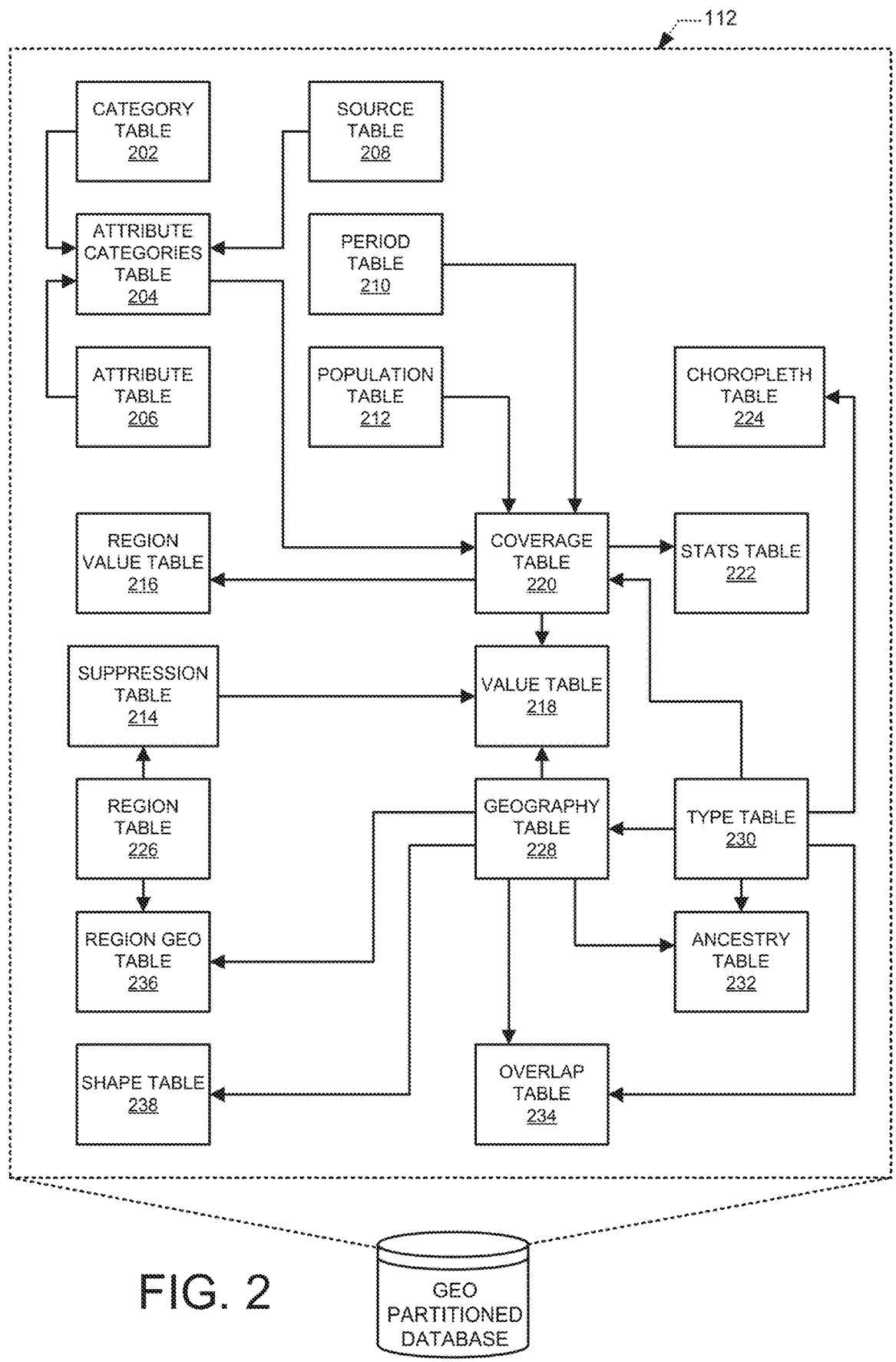
FIG. 2 is a block diagram of a geographically partitioned database.

The geo partitioned database 112 is an entity-attribute-value (EAV) database that stores the geocoded data received or otherwise retrieved from the database providers 104. Additionally, the geo partitioned database 112 includes geographic overlap data used to transform data associated with one geographic subdivision into data to be associated with another type of geographic subdivision. FIG. 2 is a block diagram of an example implementation of the geo partitioned database 112. In the illustrated example, the geo partitioned database 112 includes a category table 202, an attribute category table 204, a attribute table 206, a source table 208, a period table 210, a population table 212, a suppression table 214, a region value table 216, a value table 218, a coverage table 220, a stats table 222, a choropleth table 224, a region table 226, a geography table 228, a type table 230, an ancestry table 232, an overlap table 234, a region geo table 236, and a shape table 238.

The category table 202 defines broad categories (e.g., economic, demographic, or health outcomes) for the geocoded data to facilitate a user finding geocoded data of interest. For example, a user may be interested in sets of geocoded data related to economic issues. The attribute table 206 contains metadata related to topics (e.g., income, diabetes, smoking, etc.) associated with the geocoded data. The attribute data facilitates retrieve geocoded data for a particular topic. For example, the use may be interest in sets of geocoded data related to the employment rate. That is, a category may include multiple topics, and topics may include one or more statistical and/or demographic measurements. The attribute category table 204 associated each of the topics of the attribute table 206 to one of the categories of the category table 202.

The source table 208 defines sources of the geocoded data (e.g., the Chicago Department of Public Health, the Environmental Protection Agency, the U.S. Census Bureau, etc.) to facilitate providing information about the source (e.g., on a visual response to a query, etc.) and to facilitate retrieving sets of geocoded data related to different sources. For example, the user may be interested in data from the Environmental Protection Agency. The period table 210 defines the periods of time associated with the geocoded data (e.g., the periods in which the data was collected, etc.). Information in the period table 210 facilitates retrieving the geocoded data by time period (e.g., 2001, 2005-2015, etc.).

The population table 212 defines the sub-populations associated with the geocoded data. Rather than the population of an area (e.g., the number of people in the area), the population table 212 encodes specific groups of people into demographic categories (e.g., combinations of races, sexes, and ages). For example, a demographic category may be defined as juvenile male Caucasians.

The suppression table 214 store flags that classify geocoded data into (i) categories indicative of data not suitable for analysis and/or (ii) categories indicative that a user should be cautious when using the particular geocoded data. These flags may include, for example, (a) the numerator for a calculated rate is too small to protect privacy, (b) the denominator for a calculated rate is too small resulting in high variance on the estimate, (c) the value is an extreme outlier not supported by other evidence, and/or (d) the value has been manipulated in some way before presentation.

The value table 218 stores the geocoded data on a table that has relatively few column (e.g., 5, 10, etc.). The value table 218 stores the geocoded data for the geographic subdivisions defined by the geography table 228. The metadata about the geocoded data is stored on other tables (e.g., the coverage table 220, the geography table 228, etc.) which are directly or indirectly associated with the geocoded data via foreign keys to those tables. In the illustrated example, to select geocoded data on the value table 218, the query handler 116 first queries the coverage table 220 to retrieve geocoded data associated with the geographic subdivisions, populations, or/and time periods of interest to the user.

The region value table 216 stores the geocoded data on a table that has relatively few column (e.g., 5, 10, etc.) with no metadata. The region value table 216 store aggregate geocoded data for the regions defined by the region table 226. The metadata about the geocoded data is stored on other tables (e.g., the coverage table 220, the region table 226, etc.) which are directly or indirectly associated with the geocoded data via foreign keys to those tables.

The coverage table 220 stores which attributes are available for which geographic subdivisions, populations, or/and time periods. In such a manner, the query handler 116 is able to respond to queries about geocoded data availability without querying a larger table. That is, the coverage table 220 facilitates a user focusing a search query for the geocoded data of interest before querying a larger table. The stats table 222 stores statistical data associated with the coverage defined by the coverage table 220. In some examples, the stats table 222 includes the mean and the median values of the geocoded data on the value table 218 and the region value table 216 based on the geographic subdivisions, populations, or/and time periods. For example, the stats table 222 may store the median value for the diabetes diagnosis rate for counties. The choropleth table 224 stores data to generate choropleth maps. A choropleth map is a map visualizing geocoded data in which geographic subdivisions are shaded or colorized in proportion to the measurement of the geographical data being displayed on the map, such as diabetes diagnosis rate or per-capita income. The choropleth table 224 stores information such as outlier status and the k-means limits.

The region table 226 defines regions that encompass multiple geographic subdivisions. Each defined region is made up of geographical subdivisions of one type. In some examples, one region (e.g., a state, etc.) may be define multiple times, one for one type of geographic subdivision (e.g., zip codes) and one for another type of geographic subdivision (e.g., counties). This facilitates retrieving geographic subdivisions for a region of interest (e.g., a hospital service area, etc.). The geography table 228 defines metadata (e.g., name, latitude, longitude, population, etc.) relating to the specific geographic subdivisions. For example, the geography table 228 may include a row for each of the 66,438 census tracts in the United States. The region geo table 236 stores associations of the geographic subdivisions on the geography table 228 with the regions defines by the region table 226. The type table 230 defines metadata for the types of geographic subdivisions (e.g., census tract, zip code, community area, municipality, etc.). The ancestry table 232 defines the relationships between the different geographic subdivisions. For example, the ancestry table 232 may define that census tracts are subordinate to counties and counties are subordinate to states. As another example, the ancestry table 232 may define that municipalities are superior to community areas. Relationships more than one generation apart, such as Census tracts and states, are represented by cascading Ancestry objects. The ancestry table 232 facilitates presenting information (e.g., visually, etc.) in terms of different geographic layers.

The overlap table 234 stores the one or more geographic overlap data points (e.g., the percent of population overlap, the percent of housing overlap, the percent of land overlap, etc.) of the various geographic subdivisions to each other (e.g., the overlap between zip codes and census tracts, etc.). In some examples, the overlap table 234 is de-normalized so that each intersection between two different types of geographic subdivisions appears in the overlap table 234 twice for ease of querying. For example, the overlap table 234 may include a first row that encodes the percent that Census Tract 17031320100 overlaps Zip Code 60601, and a second row that encodes the percent that Zip Code 60601 overlaps Census Tract 17031320100. The shape table 238 defines representations of actual boundaries of the specific geographic subdivisions. In some examples, the shape table 238 includes GeoJSON and/or TopoJSON files for each of the geographic subdivisions to facilitate visually representing the geographic subdivisions on a visual interface (e.g., the web interface, etc.).

Returning to FIG. 1, the database manager 114 imports, cleans, and saves the geocoded data to the geo partitioned database 112. The database manager 114 processes the geocoded data from the database providers 104 and/or the internal geo database 110 to determine metadata and/or statistical data to insert into one of more of the tables 202-238 of the geo partitioned database 112. For example, metadata regarding the source of the geocoded data and the may be inserted into the source table 208 and the period table respectively. As another example, the geocoded data may be analyzed to determine statistics regarding the data, such as mean values, median values, count, etc., to be inserted into the stats table 222. Additionally, the database manager 114 categorizes the geocoded data as being a measurement value (e.g., a number of Section Eight housing vouchers in a geographic subdivision, etc.) or a statistical value (e.g., the percent of people within the geographic subdivision with a college degree, etc.) The database manager 114 parses the geocoded data and determines whether any values are missing. If any values are missing, the database manager 114 executes an imputation function that estimates the missing values. In some example, the imputation function is a multiple imputation with chained equations (MICE) using data available at a given geographic subdivision. In some such examples, the imputation function creates multiple potential data sets and then runs the regression model on each data sets and uses Rubin's methods to combine the results to provide coefficients and standard errors.

Using general demographic data (e.g., race, ethnicity, gender, age, etc.), the database manager 114 expands the geocoded data provided by the database providers 104 to parse the geocoded data into specific demographic categories. These demographic categories encompass one or more of demographic data types (e.g., e.g., race, ethnicity, gender, age, etc.). For example, the demographic categories may include (a) males, (b) females, (c) Hispanic males, (d) Hispanic females, (e) males over the age of 65, (f) females over the age of 65, (g) Hispanic males over the age of 65, and/or (h) Hispanic females over the age of 65, etc. In some examples, the database manager 114 parses the geocoded data into at least 90 categories. The demographic category data is inserted into the geo partitioned database 112 (e.g., in the value table 218) and is associated with the database provider 104.

Figure 3B:
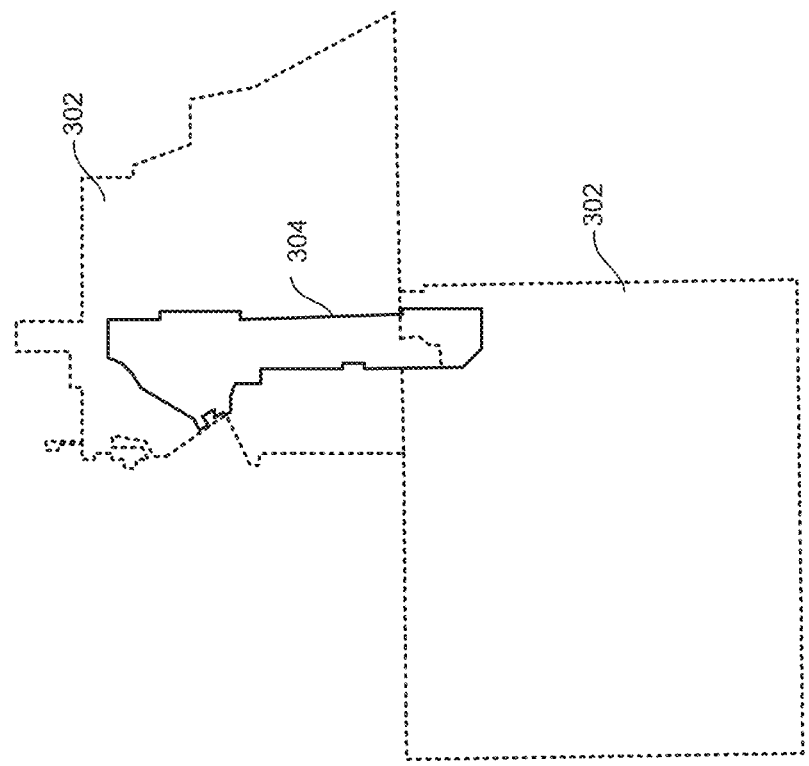
FIGS. 3A and 3B illustrate a geographical subdivision of interest for which geographically coded data is not available and multiple different geographical subdivisions for which geographically coded data is available.
Figure 3A:
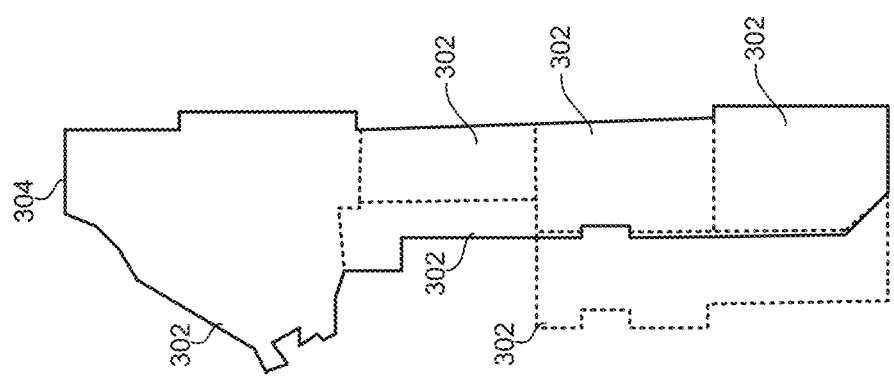

Because the geographic subdivision that a user is interested in may not be the same as the geographic subdivision that is associated with the geocoded data, the database manager 114 transforms geocoded data for different geographic subdivisions than the geographic subdivision associated with the geocoded data. For example, the user may be interested in the percentage of the population diagnosed with diabetes in a community area while the data for the percentage of the population diagnosed with diabetes may be coded for census tracts. In some examples, the transformation is performed when the geocoded data is received from the database providers and stored in the geo partitioned database 112. Alternatively, in some examples, the transformation is done on demand and in real time in response to a query from the end-user devices 102 for the geographic subdivision identified in the query. In such examples, the overlap data is stored in the geo partitioned database 112 as it is generated. As used herein, "on demand" refers to taking action in response to a request without further interaction with the requester. As used herein, "real time" refers to a time period that is simultaneous to and/or immediately after an a query is received. FIGS. 3A and 3B illustrate a visual representation of source geographic subdivisions 302 being mapped onto a target geographic subdivision 304. In FIG. 3A, census tracts are mapped onto a community area. In FIG. 3B, zip codes are mapped onto the community area. In FIGS. 3A and 3B, the target geographical subdivision (e.g., the community area) overlaps with multiple source geographical subdivisions (e.g., the census tracts, the zip codes). In some examples, the database manager 114 transforms the geocoded data for a target geographic subdivision 304 from a source geographic subdivision 302 that encompasses the target geographic subdivision 304 when basic demographic data is available for the target geographic subdivision 304.

The database manager 114 uses the geographic overlap between the target geographic subdivision 304 and the source geographic subdivisions 302 to code the data for the target geographic subdivision 304. The database manager 114 retrieves which of the source geographic subdivisions 302 overlap the target geographic subdivision 304 from the geography table 228. The database manager 114 then retrieves the percentage of the source geographic subdivisions 302 that overlap the target geographic subdivision 304 and the percentage that the target geographic subdivision 304 overlaps each of the source geographic subdivisions 302. The database manager 114 joins these two sources of information. An example of this information joined together is shown on Table (1) below.

TABLE 1

Example Overlap Percentage Between Geographic Subdivisions

| Source | Target | % of Source in Target | % of Target in Source |
|---|---|---|---|
| Tract 3302 | Armour Square | 0.06% | 0.02% |
| Tract 3403 | Armour Square | 99.84% | 8.26% |
| Tract 3404 | Armour Square | 99.94% | 11.25% |
| Tract 3405 | Armour Square | 100.00% | 16.88% |
| Tract 3406 | Armour Square | 98.81% | 18.18% |
| Tract 3504 | Armour Square | 0.19% | 0.02% |
| Tract 3515 | Armour Square | 0.20% | 0.01% |
| Tract 3805 | Armour Square | 0.02% | 0.00% |
| Tract 8355 | Armour Square | 0.03% | 0.01% |
| Tract 8400 | Armour Square | 3.43% | 0.79% |
| Tract 8401 | Armour Square | 0.10% | 0.01% |
| Tract 8402 | Armour Square | 0.29% | 0.09% |
| Tract 8410 | Armour Square | 0.13% | 0.07% |
| Tract 8411 | Armour Square | 99.06% | 44.01% |
| Tract 8420 | Armour Square | 0.24% | 0.05% |
| Tract 8432 | Armour Square | 0.29% | 0.36% |

The database manager 114 then retrieves, from the value table 218, the populations for each of the source geographic subdivisions 302 and the target geographic subdivision 304. Example populations of the geographic subdivisions 302 and 304 are illustrated on Table (2) below.

TABLE 2

Example Populations of the Geographic Subdivisions

| Geographic Subdivision | Population |
|---|---|
| Tract 3302 | 447 |
| Tract 3403 | 837 |
| Tract 3404 | 2,999 |
| Tract 3405 | 917 |
| Tract 3406 | 736 |
| Tract 3504 | 1,647 |
| Tract 3515 | 1,783 |
| Tract 3805 | 2,005 |
| Tract 8355 | 1,629 |
| Tract 8400 | 2,580 |
| Tract 8401 | 1,437 |
| Tract 8402 | 2,538 |
| Tract 8410 | 2,759 |
| Tract 8411 | 2,639 |
| Tract 8420 | 3,730 |
| Tract 8432 | 7,673 |
| Armour Square | 14,047 |

The database manager 114 retrieves the geocoded data of interest (such as the percent of the population diagnosed with diabetes, etc.) from the value table 218. Example geocoded data from the source geographic subdivision is on Table (3) below.

TABLE 3

Example Geocoded Date from the Source Geographic Subdivision

| | Geocoded Data | |
|---|---|---|
| Source | Value | Standard Error |
| Tract 3302 | 9.9% | 0.331633 |
| Tract 3403 | 15.1% | 0.586735 |
| Tract 3404 | 11.4% | 0.510204 |
| Tract 3405 | 15.4% | 0.43367 |
| Tract 3406 | 26.7% | 0.816327 |
| Tract 3504 | 22.7% | 0.892857 |
| Tract 3515 | 9.4% | 0.408163 |
| Tract 3805 | 13.3% | 0.637755 |
| Tract 8355 | 22.3% | 0.841837 |

TABLE 3-continued

Example Geocoded Date from the Source Geographic Subdivision

| | Geocoded Data | |
|---|---|---|
| Source | Value | Standard Error |
| Tract 8400 | 9% | 0.229592 |
| Tract 8401 | 11.8% | 0.433673 |
| Tract 8402 | 11% | 0.331633 |
| Tract 8410 | 11.2% | 0.459184 |
| Tract 8411 | 16.1% | 0.663265 |
| Tract 8420 | 9.2% | 0.357143 |
| Tract 8432 | 11.6% | 0.408163 |

The database manager 114 selects as a weighted value the percentage of the target geographic subdivision 304 in the source geographic subdivision 302. Alternatively in some examples, because some geocoded data is only relevant to certain subsets of the population (e.g., the teen pregnancy rate, etc.), the database manager 114 calculates a composite weight. In some examples, the composite weight is calculated in accordance with Equation (1) below $$W_C = P_{S \to T} \times \frac{R_S}{R_T} \quad \text{Equation (1)}$$

In Equation (1) above, $W_C$ is the composite weight, $P_{S \to T}$ is the percentage of the target geographic subdivision 304 in the source geographic subdivision 302 (e.g., by population), $R_S$ is the relevant population in the source geographic subdivision 302, and $R_T$ is the relevant population in the target geographic subdivision 304. For example, if the percentage of Armour Square that is in Tract 3405 is 16.88%, the population of teenage females in Tract 3407 is 87, and population of teenage females in Armour Square is 1382, the composite weight for Tract 3405 may be 0.01.

The database manager 114 calculates the weight values for each of the source geographic subdivisions 302 by in accordance with Equation (2) below.

$$V_W = V_S \times W_S \quad \text{Equation (2)}$$

In Equation (2) above, $V_W$ is the weighted value, $V_S$ is the value associated with the source geographic subdivision 302 and $W_S$ is the weight associated with the source geographic subdivisions 302. For example, if the weight associated with Tract 3405 is 0.1688 and the value (such as the percentage of the population diagnosed with diabetes) is 15.4%, the weighted value for Tract 3405 may be 2.6%.

The database manager 114 calculates a weighted standard error associated with each of the source geographic subdivisions 302. The weighted standard error incorporates different measures of certainty, (i) the geographic overlap of the source geographic subdivision 302 and the target geographic subdivisions 304, (ii) the population density within a sub-population in the source geographic subdivision 302, and/or (iii) the standard error of the geocoded data associated with the source geographic subdivision 302. In some examples, the weight standard error is calculated in accordance with Equation (3) below.

$$W_{SE} = W_S^2 \times SE_S^2 \quad \text{Equation (3)}$$

In Equation (3) above, $W_{SE}$ is the weight standard error, $W_S$ is the weight (e.g., or the composite weight) associated with the source geographic subdivision 302, and $SE_S$ is the standard error associated with geocoded data of the source geographic subdivision 302. For example, if the weight associated with the source geographic subdivision 302 is 0.1688 and the standard error associated with geocoded data of the source geographic subdivision 302 is 0.43367, the weight standard error may be 0.0054.

The database manager 114 sums the weighted values and the weight standard error for each of the source geographic subdivision 302 to calculate the value and the standard error to associated with the target geographic subdivision 304. For example, the percentage of the population diagnosed with diabetes in Armour Square may be 17.21% with a standard error of 0.1182%.

The query handler 116 receives queries from the end-user devices 102 and parses the queries to generate a database query to retrieve the requested geocoded data from the geo partitioned database 112. The query handler 116 transforms the geocoded data in accordance with the queries, and provides the transformed geocoded data to the requesting end-user device 102. In some examples, the query handler 116 provides the transformed geocoded data via the API or via the web interface. In some examples, the transformed geocoded data is presented visually on a color-coded map and/or a chart (such as a scatter plot chart, etc.). Additionally or alternatively, in some examples, the transformed geocoded data is provided as a tabular data (e.g., a spreadsheet, a comma-separated values (CSV) file, etc.).

In some examples, the query handler 116 receives geocoded data from the end-user devices 102. The query handler 116 forwards such geocoded data to the database manager 114 to be processed like data from the database providers 104.

Figure 4:
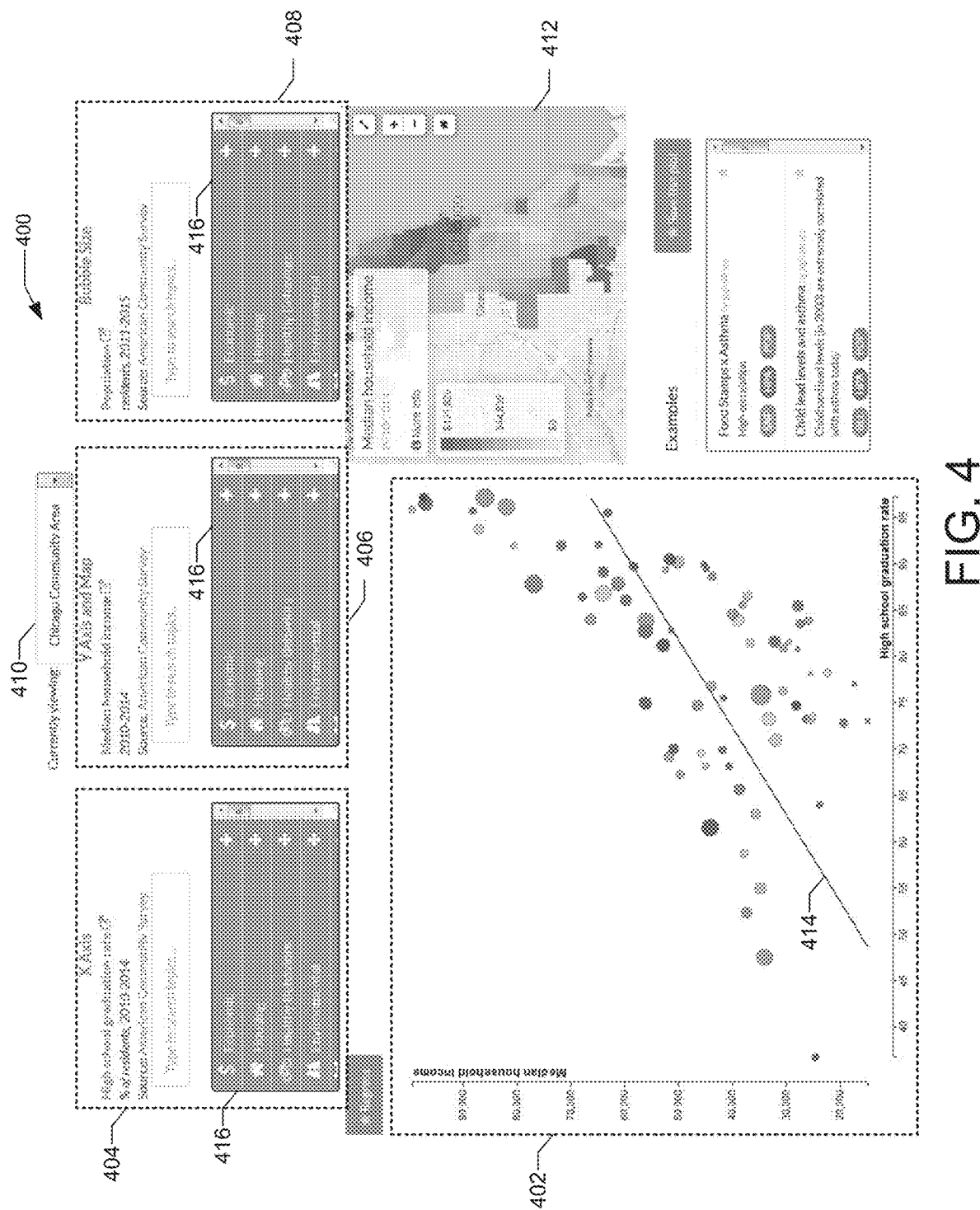
FIG. 4 illustrates an example interface to query the database of FIG. 2 and to receive query results.

FIG. 4 is an example interface 400 which may be presented by the query handler 116 to facilitate receiving queries from a user and providing query results to the user. In the illustrated example, the interface includes a graph 402, query fields 404-410, and a choropleth map 412. The graph 402 visually presents the query results with two topics (e.g., selected in query fields 404 and 406). In the illustrated example, the graph 402 is a scatter plot graph. However, the graph 402 may be any suitable graph to compare the relationship between two topics. In the illustrated example, the graph 402 includes a trend line 414. The query fields 404-408 provide an interface to select topics of interest and to display informational data about the selected topics. The query fields 404-408 include a selection box 416 that facilitates browsing the available topics organized by categories (e.g., defined by the category table 202) and/or attributes (e.g., defined by the attribute table 206) (sometime referred to as "topics"). To populate the selection box 416, the query handler 116 does not need to query the value table 218 or the region value table 216 to determine the available topics; rather, the query handler 116 queries the attribute category table 204. The query field 410 provides an interface for a user to selected the geographic subdivision of interest to use for the graph 402 and the choropleth map 412. The choropleth map 412 visualizes geocoded data selected via the query field(s) 404 and/or 406 in which geographic subdivisions selected in the query field 410 are shaded or colorized in proportion to the measurement of the geographical data being displayed on the map (e.g., based on the metadata stored on the stats table 222 and/or the choropleth table 224). The shapes of the geographic subdivisions on the choropleth map 412 are retrieved from the shape table 238.

Figure 5:
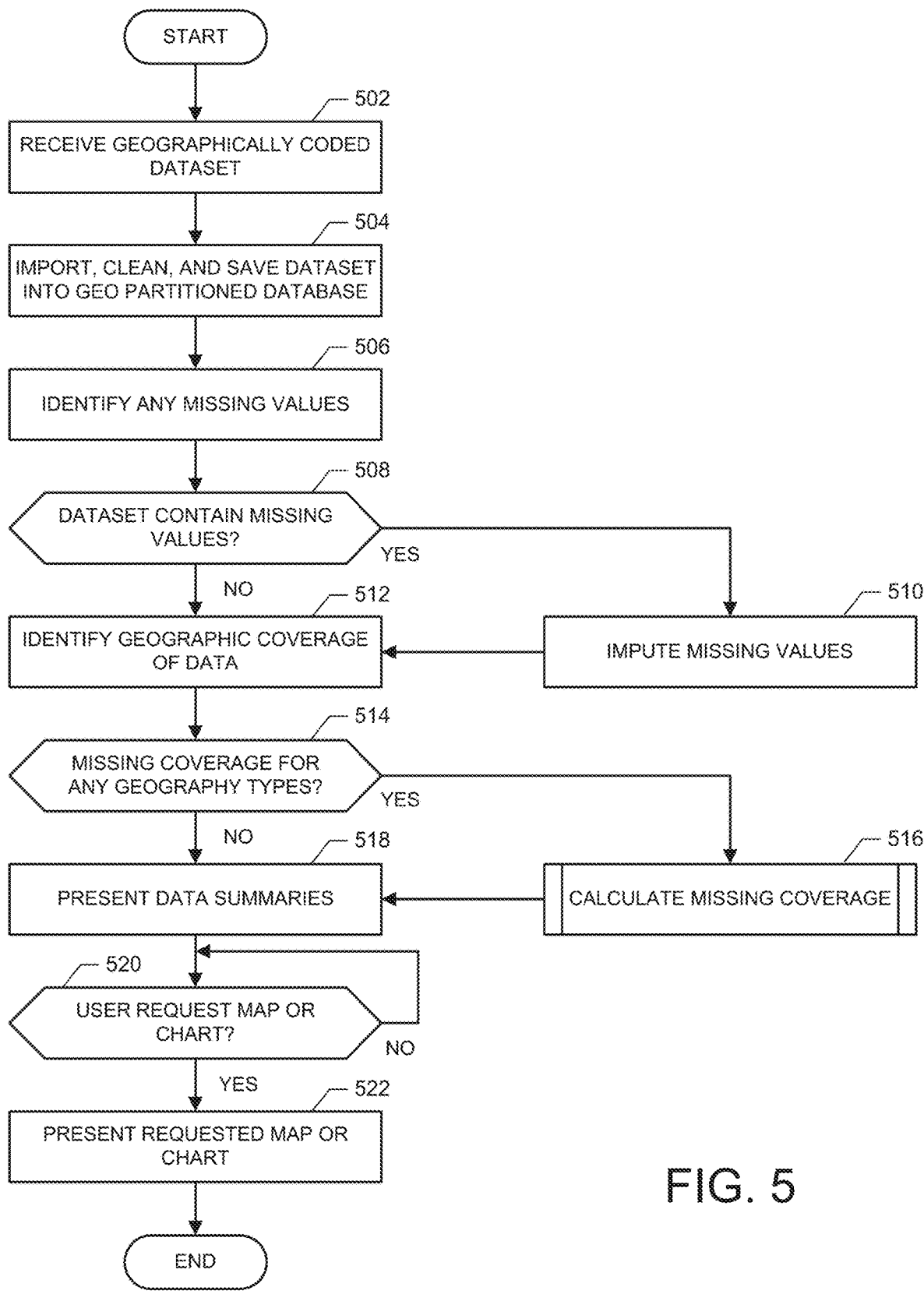
FIG. 5 is a flowchart of a method to retrieve geographically coded data for a geographical subdivision from the geographically partitioned database of FIG. 2 where the requested data is not originally coded for the geographical subdivision, which may be implemented by the electronic components of FIG. 7.

FIG. 5 is a flowchart of a method to retrieve geographically coded data for a geographical subdivision from the geo partitioned database 112 of FIGS. 1 and 2 where the requested data is not originally coded for the geographical subdivision, which may be implemented by a server (e.g., the server of FIG. 7 below). Initially, at block 502, the database manager 114 receives or otherwise retrieves the geocoded data from the database provider(s) 104. At block 504, the database manager 114 imports, cleans, and saves the geocoded data into the geo partitioned database 112. At block 506, the database manager 114 identifies missing values in the geocoded data. For example, the geocoded data coded to 3,130 counties may not include values for 780 counties. At block 508, the database manager 114 determines whether there are any missing values. If there are missing value, the method continues to block 510. Otherwise, if there are not missing values, the method continues to block 512.

At block 510, the database manager 114 imputes the missing values with an imputation function (e.g., MICE, nearest neighbor, etc.). At block 512, the database manager 114 identifies the geographic coverage (e.g., which geographic subdivisions is the geocoded data coded for). For example, the geocoded data may be coded for census tracts or census tracts and zip codes. At block 514, the database manager 114 determines if the geocoded data is missing coverage for some of the geographic subdivisions. For example, the geocoded data coded for census tracts would be missing coverage for community areas, service areas, municipalities, counties, and states, etc. If the geocoded data is missing coverage, the method continues at block 516. Otherwise, if the geocoded data is not missing coverage, the method continues at block 518.

At block 516, the database manager 114 calculates the missing coverage. An example method to calculate the missing coverage is described in relation to FIG. 6 below. At block 518, the query handler 116 presents summaries of the geocoded data in the geo partitioned database 112 to a user via the end-user device 102. At block 520, the query handler 116 waits until receiving a query from the end-user device 102. At block 522, the query handler 116 queries the geo partitioned database 112 and presents the results to the end-user device 102.

Figure 6:
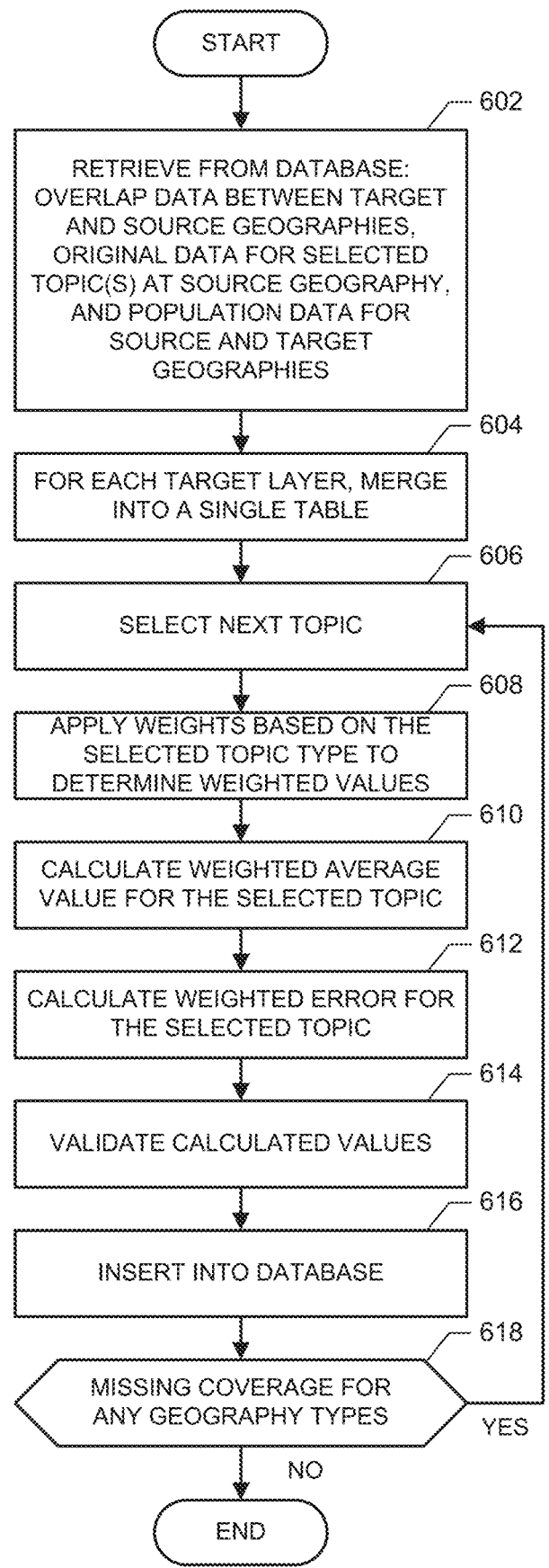
FIG. 6 is a flowchart of a method to determine the geographically coded data for a geographical subdivision for which the requested data is not originally coded, which may be implemented by the electronic components of FIG. 7.

FIG. 6 is a flowchart of a method to determine the geographically coded data for a geographical subdivision for which the requested data is not originally coded, which may be implemented by a server (e.g., the server of FIG. 7 below). Initially, at block 602, the database manager 114 retrieves, from the geo partitioned database 112, (i) overlap data between the source geographic subdivisions 302 and the target geographic subdivision 304 (e.g., from the overlap table 234), the original data (e.g., the values and the standard errors, etc.) from the source geographic subdivisions 302 (e.g., from the value table 218) regarding the topics associated the geocoded data associated with the source geographic subdivisions 302 (e.g., median household income, average air quality index, etc.), and population data from the source geographic subdivisions 302 and the target geographic subdivision 304 (e.g., from the geography table 228). At block 604, the database manager 114 mergers the data retrieved at block 602 into a single temporary table. At block 606, the database manager 114 selects the next topic. At block 608, the database manager determines applies weights to the geocoded data values associated with the source geographic subdivisions 302 based on the type of value (e.g., a count-type value or a percentage-type value). Geocoded data values that count a number of occurrences of something in the geographic subdivision is a count-type value. For example, the number of teenage pregnancies in a census tract is a count-type value. Geocoded data values that determine a percentage of a population within geographic subdivision that exhibit some traits is a percentage-type value. For example, the percentage of the population that has been diagnosed with lupus within a county is a percentage-type value.

At block 610, the database manager 114 calculates a weighted value for the target geographic subdivision 304 based on the weighted values of the source geographic subdivisions 302. At block 612, the database manager 114 calculates the weighted standard error for the target geographic subdivision 304 based on weighted standard errors for each of the source geographic subdivisions 302. At block 614, the database manager 114 validates the calculated weighted values. For example, the database manager 114 may compare the calculated weighted values to a range of values from the source geographic subdivisions 302. At block 616, the database manager 114 inserts the weighted values and weighted standard into the geo partitioned database 112 (e.g., into the value table 218, etc.). At block 618, the database manager 114 determines whether there is missing coverage for any other geographic subdivision. If there is missing coverage for any other geographic subdivision, the method returns to block 606.

Figure 7:
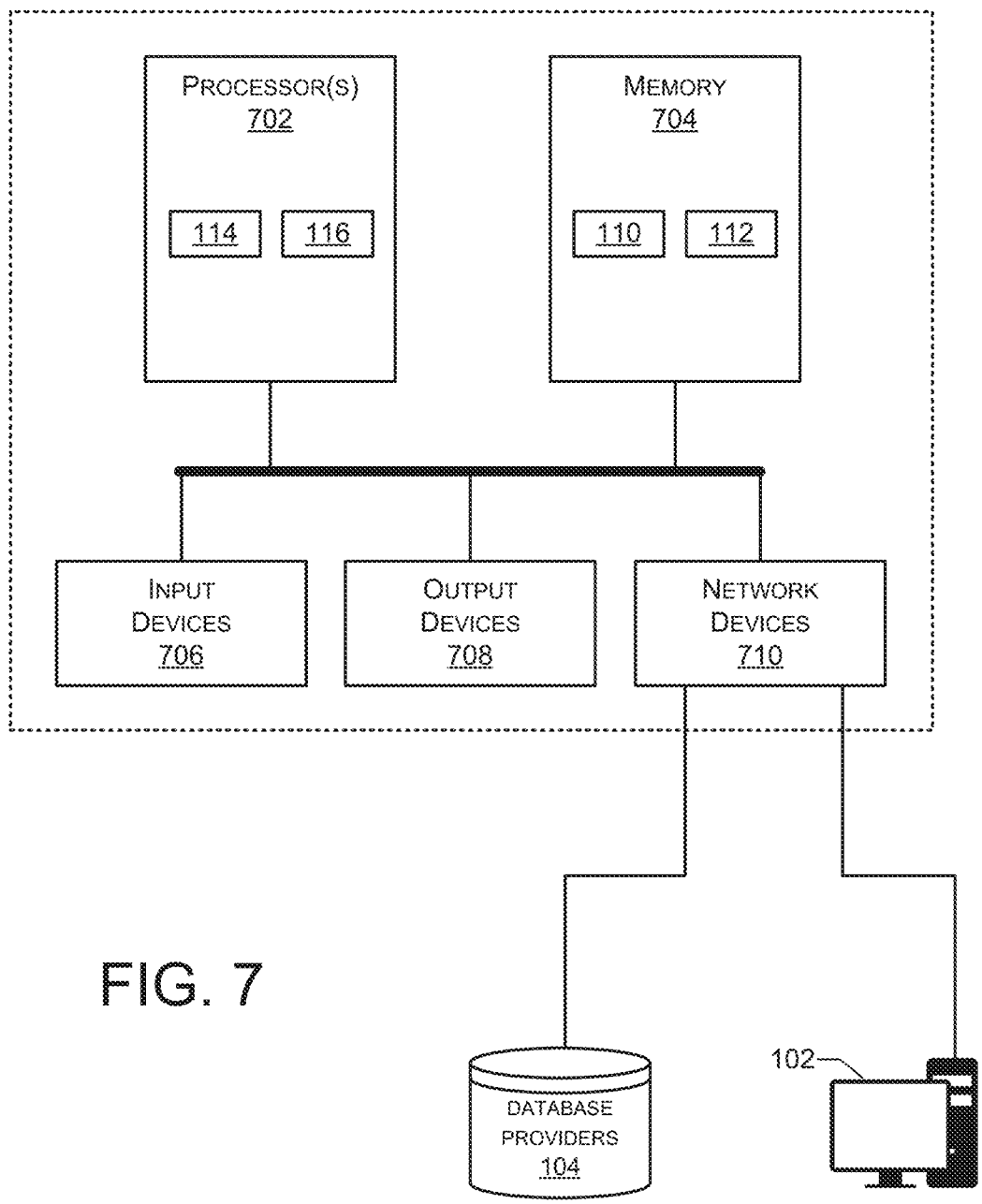
FIG. 7 is a block diagram of a server.

FIG. 7 is a block diagram of a server 700 of the GAE 106. As illustrated in FIG. 7, the server 700 includes a controller or processor 702. Further, the server 700 includes memory 704, input device(s) 706, output device(s) 708, and network device(s) 710.

In the illustrated example, the processor 702 is structured to include the database manager 114 and the query handler 116. The processor 702 of the illustrated example may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the memory 704 is volatile memory (e.g., RAM including non-volatile RAM, magnetic RAM, ferroelectric RAM, etc.), non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). Further, in some examples, the memory 704 includes multiple kinds of memory, particularly volatile memory and non-volatile memory. In the illustrated example, the memory 704 includes the geo partitioned database 112 and/or the internal geo database 110.

The memory 704 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 704, the computer readable medium, and/or within the processor 702 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 706 enable a user, such as an information technician of the GAE 106, to provide instructions, commands, and/or data to the processor 702. Examples of the input device(s) 706 include one or more of a button, a control knob, an instrument panel, a touch screen, a touchpad, a keyboard, a mouse, a speech recognition system, etc.

The output device(s) 708 of the illustrated example display output information and/or data of the processor 702 to a user, such as an information technician of the GAE 106. Examples of the output device(s) 708 include a liquid crystal display (LCD), an organic light emitting diode (OLED) display, a flat panel display, a solid state display, and/or any other device that visually presents information to a user. Additionally or alternatively, the output device(s) 708 may include one or more speakers and/or any other device(s) that provide audio signals for a user. Further, the output device(s) 708 may provide other types of output information, such as haptic signals.

The example network devices 710 include any suitable communication device that facilitates communication with the end-user devices 102 and/or the database providers 104 over the external network 108.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for processing a search query for geocoded data, the system comprising:
    an entity-attribute-value (EAV) database including the geocoded data associated with first and second geographic subdivisions;
    a network connector to communicatively couple to end-user devices and database providers;
    a computing device configured to:
        in response to receiving new geocoded data with first values associated with the first geographic subdivision from one of the end-user devices or one of the database providers, determine whether the new geocoded data includes second values associated with the second geographic subdivision;
        in response to determining that the new geocoded data does not include second values associated with the second geographic subdivision, generate the second values associated with the second geographic subdivision for the new geocoded data based on geographic overlap of the first and second geographic subdivisions stored in the EAV database;
        insert the new geocoded data including the first and second values into the EAV database; and
        in response to receiving a query from one of the end-user devices for the new geocoded data associated with the second geographic subdivisions, provide the second values in a query response.

2. The system of claim 1, wherein the computing device is to determine weights for the geocoded data associated with the first geographic subdivision based on a percentage of the first geographic subdivisions that is within each of the second geographic subdivisions.

3. The system of claim 2, wherein to generate the second values associated with the second geographic subdivision for the new geocoded data, the computing device is to determine a type of the geocoded data associated with the first geographic subdivisions.

4. The system of claim 3, wherein the type of the geocoded data is one of a count type or a percentage type.

5. The system of claim 3, wherein the computing device is to apply the weights to the first values the geocoded data associated with the first geographic subdivision based on the type of the geocoded data.

6. The system of claim 1, wherein the computing device is to determine weights for the geocoded data associated with the first geographic subdivision based on (i) a percentage of the first geographic subdivisions that is within each of the second geographic subdivisions and (ii) a first population of a demographic group in the first geographic subdivision and a second population of the demographic group in the second geographic subdivision.

7. The system of claim 1, wherein the computing device is to determine weights for standard error values associated with the geocoded data of the first geographic subdivision based on a percentage of the first geographic subdivisions that is within each of the second geographic subdivisions.

8. The system of claim 1, wherein the computing device is to, when the new geocoded data is received, the second values are generated, and before the query is received:
    perform statistical analysis on the new geocoded data and the first and second values; and
    insert results of the statistical analysis into the EVA database.

9. The system of claim 1, wherein computing device is to provide the values in the query response via an application programming interface.

10. The system of claim 1, wherein computing device is to wherein the provide the values in the query response in a visual format via a web interface.

11. The system of claim 10, wherein the visual format includes at least one of a scatter plot graph or a choropleth map.

12. A method to process a search query for geocoded data, the method comprising:
    maintaining a database that includes the geocoded data associated with first and second geographic subdivisions;
    communicatively coupling, with a network connector, to end-user devices and database providers;
    in response to receiving, via the network connector, new geocoded data including first values associated with the first geographic subdivision from one of the end-user devices or one of the database providers
    generating, with a processor, second values associated with the second geographic subdivision for the new geocoded data based on geographic overlap of the first and second geographic subdivisions stored in the database;

inserting the new geocoded data including the first and second values into the database; and in response to receiving the search query from one of the end-user devices for the new geocoded data associated with the second geographic subdivisions, providing the second values in a query response.

13. The method of claim 12, wherein the database is an entity-attribute-value database.

14. The method of claim 12, including, in response to receiving an initial search query, providing an initial query response with metadata associated with the geocoded data and metadata associated with the first and second geographic subdivisions without retrieving the geocoded data or the first or second values from the database.

15. The method of claim 12, including determining weights for the geocoded data associated with the first geographic subdivision based on a percentage of the first geographic subdivisions that is within each of the second geographic subdivisions.

16. The method of claim 12, including determining weights for the geocoded data associated with the first geographic subdivision based on (i) a percentage of the first geographic subdivisions that is within each of the second geographic subdivisions and (ii) a first population of a demographic group in the first geographic subdivision and a second population of the demographic group in the second geographic subdivision.

17. The method of claim 12, including determining weights for standard error values associated with the geocoded data of the first geographic subdivision based on a percentage of the first geographic subdivisions that is within each of the second geographic subdivisions.

18. The method of claim 12, including, when the new geocoded data is received, the second values are generated, and before the query is received:

performing statistical analysis on the new geocoded data and the first and second values; and inserting results of the statistical analysis into the EAV database.

19. The method of claim 12, including providing the values in the query response in a visual format via a web interface.

20. The system of claim 19, wherein the visual format includes at least one of a scatter plot graph or a choropleth map.

* * * * *